(No Model.)
P. BARCLAY.
SAFETY WATER GAGE.
No. 423,206. Patented Mar. 11, 1890.
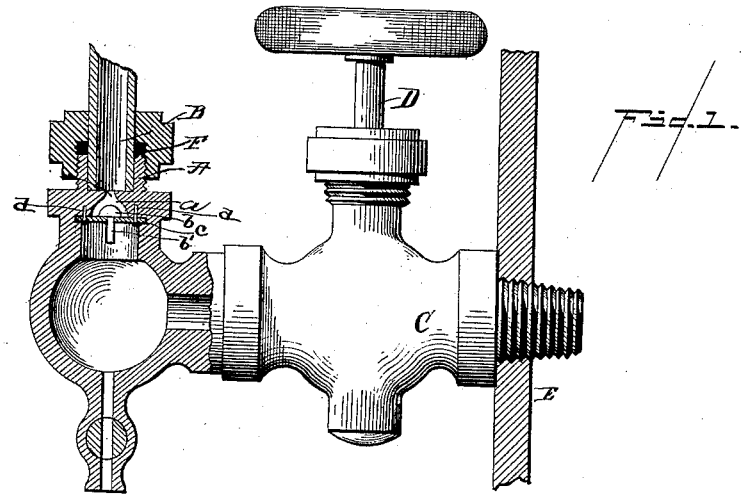
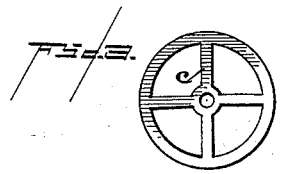
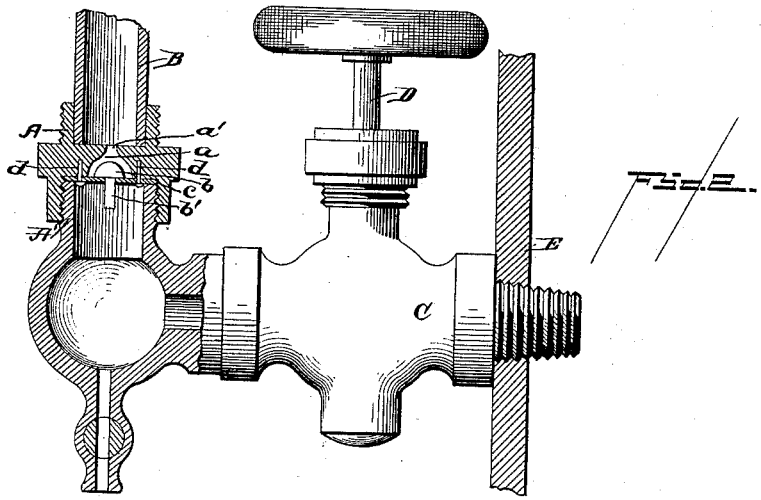
WITNESSES
Edwin L. Yewell.
W. H. Pumphrey.
INVENTOR
Peter Barclay
By Marcellus Bailey
his Attorney.

UNITED STATES PATENT OFFICE.

PETER BARCLAY, OF WINTHROP, MASSACHUSETTS.

SAFETY WATER-GAGE.

SPECIFICATION forming part of Letters Patent No. 423,206, dated March 11, 1890.

Application filed April 25, 1888. Renewed August 29, 1889. Serial No. 322,277. (No model.)

*To all whom it may concern:*

Be it known that I, PETER BARCLAY, of Winthrop, in the State of Massachusetts, have invented a certain new and useful Improvement in Safety Water-Gages, of which the following is a specification.

My invention relates to means for shutting off from a water-gage the water or steam, or both, in event of the breaking of the water-glass; and it involves the use of a valve arranged to automatically close whenever that event occurs. Automatically-closing valves for this purpose are not, broadly, new, the same being shown in prior patents granted to myself as well as to others.

Under my invention the automatic valve is arranged in and carried by the nut which receives the end of the water-glass. It is this feature which mainly characterizes my improvement. The valve is so arranged that by unscrewing the nut it can be readily got at and removed whenever it may be desired to regrind it or to clean it and its seat, which latter is also formed in the nut. The device is readily applicable to gages of otherwise ordinary or suitable construction, all that is needed being to remove the old nut and replace it with my improvement; or my improved nut can, if desired, be superadded to the old nut without requiring the removal of the latter. All this will be readily understood by reference to the accompanying drawings, in which—

Figure 1 is a vertical axial section of a water-gage embodying my invention, the upper part being in elevation. Fig. 2 is a similar view of the lower half of a modified form of gage in which my improved valve-containing nut is superadded to the ordinary nut, which usually receives the end of the water-glass. Fig. 3 is an enlarged view of the bridge for the automatic valve.

In Fig. 1, A is the nut which receives the lower end of the water-glass B, this nut differing essentially from the ordinary nut only in that it is formed with a concave valve-seat $a$, to receive the rounded valve $b$, provided with a guide-stem $b'$, which passes through the thin bridge $c$, secured by screws $d$ or other suitable instrumentalities to the nut. The valve closes the passage $a'$ through the nut into the water-glass.

The nut is united in the usual way with the stop-valve case C, and is interposed between said case (or the stop-valve D carried by said case) and the water-glass B.

E is the boiler, into which the case C screws.

F is the packing-gland, which screws down upon the nut A. If desired, my improved valve arrangement can be applied to the upper end of the water-glass also. This, however, in practice will be hardly necessary, inasmuch as the great danger when the glass breaks is not from steam but from scalding water.

By closing the top and bottom stop-valves D the nut can be taken off and put back while the boiler is under full pressure, thus permitting the repairing, replacing, or grinding of the automatic valve at any time without interfering with the continuous use of the boiler. When the nut is taken off, the valve can be readily got at by removing the bridge $c$. The bridge, as before said, is quite thin, so that there is really nothing to clog or impede the free movement of the valve. I prefer to give the automatic valve a rounded face, as shown, to prevent it from sticking in its seat.

In the modification shown in Fig. 2 the valve-holding nut A does not connect directly with the stop-valve stem, but it screws upon the neck of the ordinary nut A' of the water-gage, for which purpose the valve-holding nut A is provided below the valve with an internally-screw-threaded end, which is gaged to fit upon the externally-screw-threaded neck of the nut A'. In other words, the nut A is simply superadded to the customary water-gage, taking the place on the neck of nut A which ordinarily is occupied by the gland F, the latter being transferred to the neck of the valve-holding nut A. With a nut of this modified structure my improvement can be applied to water-gages now in the market without requiring the removal of their existing parts.

Having described my improvement and the manner in which the same is or may be carried into effect, what I claim herein as new and of my own invention is as follows:

In combination with the stop-valve and the water-glass of a water-gage, the nut A, provided with a seat or socket for the glass, a valve-seat $a$ and passage $a'$, the valve $b\ b'$, the bridge $c$, removably secured to said nut, and an internally-screw-threaded extension on the other side of the bridge from the valve proper $b$, as and for the purposes hereinbefore set forth.

In testimony whereof I have hereunto set my hand this 24th day of April, A. D. 1888.

PETER BARCLAY.

Witnesses:
 ALBERT B. DUNHAM,
 J. FRED. LANG.